(12) United States Patent
Andersen

(10) Patent No.: US 7,878,525 B2
(45) Date of Patent: Feb. 1, 2011

(54) FIFTH WHEEL HITCH SYSTEM

(76) Inventor: John I. Andersen, 1225 Oakmeadow Cir., Idaho Falls, ID (US) 83406

( * ) Notice: Subject to any disclaimer, the term of this patent is extended or adjusted under 35 U.S.C. 154(b) by 186 days.

(21) Appl. No.: 12/128,548

(22) Filed: May 28, 2008

(65) Prior Publication Data

US 2009/0295125 A1    Dec. 3, 2009

(51) Int. Cl.
*B62D 53/06*    (2006.01)
(52) U.S. Cl. .......... 280/439; 280/416.1; 280/418.1; 280/433; 280/438.1; 280/441.2; 280/440; 280/441.1; 280/511
(58) Field of Classification Search .......... 280/418.1, 280/416.1, 439, 433, 438.1, 441.2, 440, 441.1, 280/511
See application file for complete search history.

(56) References Cited

U.S. PATENT DOCUMENTS

| | | | |
|---|---|---|---|
| 4,576,395 A | 3/1986 | Longoria | |
| 5,868,415 A | 2/1999 | Van Vleet | |
| 6,024,372 A | 2/2000 | Colibert et al. | |
| 6,050,588 A | 4/2000 | Kissack | |
| 6,135,482 A | 10/2000 | Larkin | |
| 6,199,891 B1 | 3/2001 | Bell et al. | |
| 6,234,509 B1 | 5/2001 | Lara | |
| 6,264,229 B1 | 7/2001 | Gill et al. | |
| 6,540,246 B2 | 4/2003 | Andersen et al. | |
| 6,883,820 B2 * | 4/2005 | Freeman | 280/441.2 |
| 7,378,013 B2 * | 5/2008 | Sandler | 280/507 |

* cited by examiner

*Primary Examiner*—Lesley Morris
*Assistant Examiner*—Marlon A Arce
(74) *Attorney, Agent, or Firm*—David B. Tingey; Kirton & McConkie

(57) ABSTRACT

A precision, light weight, high strength hitch for coupling a trailer or other vehicle to a towing vehicle. The hitch includes a mounting ball attached to a portion of the trailer or other vehicle and a ball socket attached to the towing vehicle. The mounting ball and the ball socket have compatible surfaces that permit seating of the two components regardless of the axial, transverse or longitudinal angular or rotational orientation of the two vehicles.

21 Claims, 6 Drawing Sheets

FIFTH WHEEL HITCH SYSTEM

BACKGROUND OF THE INVENTION

1. Field of the Invention

The present invention relates to technologies for attaching vehicles via a fifth wheel hitch system. In particular, the present invention relates to systems and methods for coupling a trailer or other vehicle to a towing vehicle via a fifth wheel hitch configuration, regardless of the angular relationship between the trailer and the towing vehicle.

2. Background and Related Art

Fifth wheel hitch designs include a coupling device mounted to the towing vehicle, and a compatible coupling pin or king pin located on the trailer. The fifth wheel hitch connection is made by carefully aligning the king pin and the coupling device such that the king pin engages the coupling device.

Many difficulties exist with current fifth wheel hitch systems. For example, the process of properly aligning the king pin and the coupling device requires that the trailer and the towing vehicle be generally aligned in the same horizontal and vertical planes. This process of aligning can be quite complicated, especially where terrain upon which the vehicles are located is uneven or otherwise non-ideally situated. Thus, a consumer is limited in when and where the hitch system can be used.

Additionally, current fifth wheel hitch designs are based upon commercial needs by the trucking industry and are therefore ill-suited for recreational use by average consumers. Thus, where a consumer desires the use of a fifth wheel hitch system, the consumer is required to inconveniently modify their towing vehicle to incorporate heavy and bulky equipment ideally suited for semi trucks or other commercial grade vehicles. These modifications and systems are expensive, bulky and difficult to setup and remove. As such, the consumer is dissuaded from removing the system from their towing vehicle consequently losing alternative uses of their towing vehicle due to the presence of the fifth wheel hitch equipment.

Thus, while fifth wheel hitch systems and techniques currently exist, challenges still exist. Accordingly, it would be an improvement in the art to augment or even replace current techniques with other techniques.

SUMMARY OF THE INVENTION

The present invention relates to technologies for attaching vehicles via a fifth wheel hitch system. In particular, the present invention relates to systems and methods for coupling a trailer or other vehicle to a towing vehicle via a fifth wheel hitch configuration, regardless of the angular relationship between the trailer and the towing vehicle.

Implementation of the present invention takes place in association with a fifth wheel hitch system including a base member and a pin box. The base member is generally pyramid shaped and attaches to the towing vehicle with a series of bolts or other fastening devices. The base member further includes a receiving feature located at the apex of the base. The receiving feature is compatibly designed to receive a modified king pin located on the pin box of the trailer. The king pin is modified to be encased within a spherical mounting ball. The mounting ball is compatibly designed to encase the king pin and provide a uniform, spherical surface to the king pin.

The circumference of the mounting ball is selected to fit compatibly within a spherical or concave surface of the receiving feature of the base member. The spherical shapes of the mounting ball and the receiving feature allow the mounting ball and the receiving feature to achieve coupling regardless of the angular relationship of the trailer and the towing vehicle. As such, the fifth wheel system of the present invention permits coupling and uncoupling of the system for a variety of terrains and conditions not currently possible with current fifth wheel hitch systems.

While the methods and processes of the present invention have proven to be particularly useful in the area of towing and hauling, those skilled in the art can appreciate that the methods and processes can be used in a variety of different applications and in a variety of different areas of manufacture to yield functionally equivalent results.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to technologies for attaching vehicles via a fifth wheel hitch system. In particular, the present invention relates to systems and methods for coupling a trailer or other vehicle to a towing vehicle via a fifth wheel hitch configuration, regardless of the angular relationship between the trailer and the towing vehicle.

Figure 1:
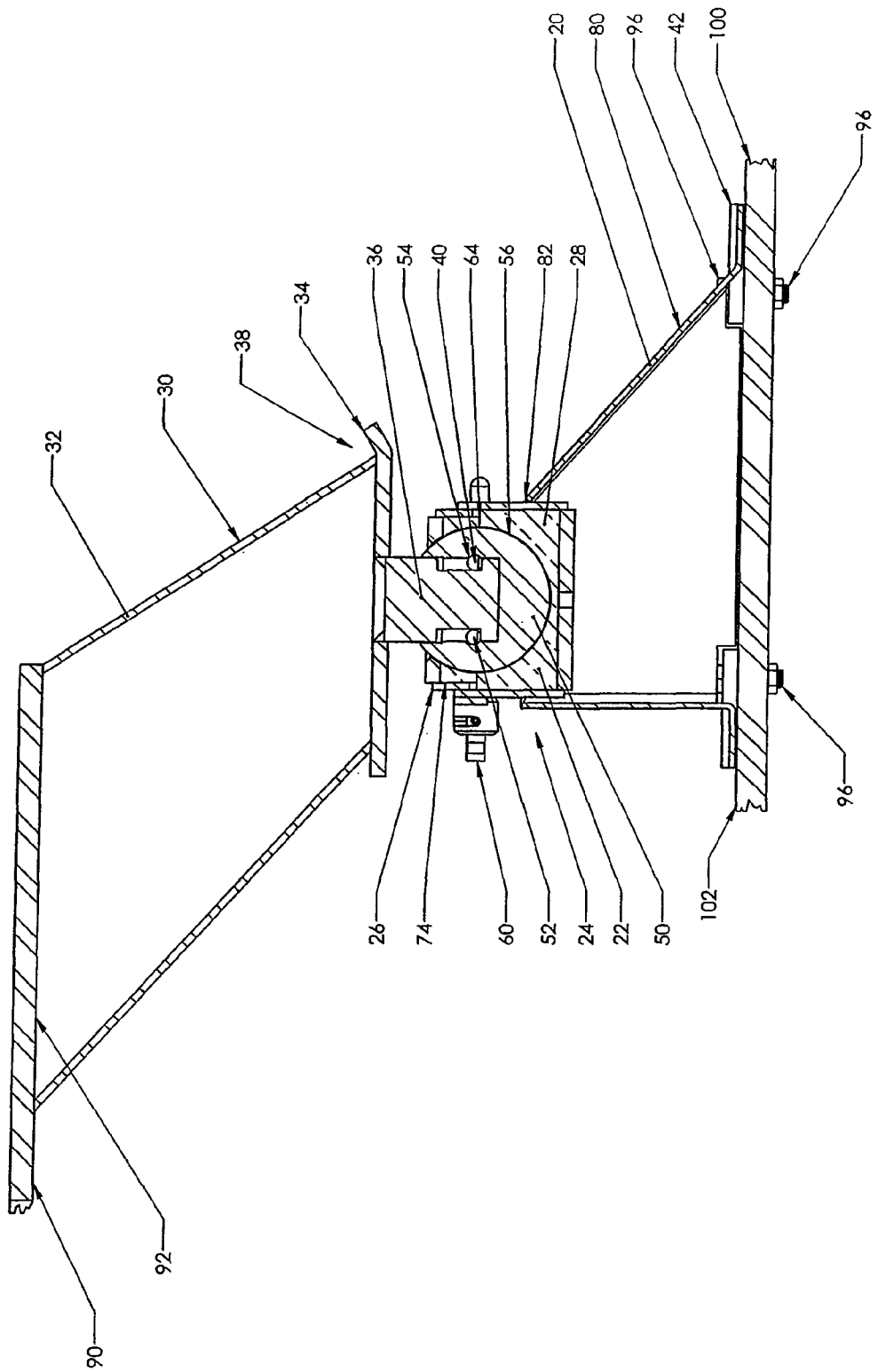
FIG. 1 is a cross-sectioned side view of a representative embodiment of the present system in a coupled configuration.

Referring now to FIG. 1, a cross-sectioned view of an implementation of the current invention is shown. The fifth wheel hitch system 10 comprises a base 20 and a pin box 30. The fifth wheel hitch system 10 generally comprises materials that are compatible with the extreme conditions inherent in towing and hauling activities. For example, extreme masses and forces are applied to both the base 20 and the pin box 30 during towing activities. As such, materials having high tensile strength are preferred for use with the current system 10. Additionally, lightweight materials having high tensile strength are further preferred so as to reduce the overall weight of the current system 10 while maintaining the strength required by towing activities. For example, in one embodiment the pin box 30 comprises steel while the base 20 comprises an aluminum alloy, or carbon steel.

The pin box 30 is an extended portion of a trailer 90 or other vehicle configured to extend proximally towards the base 30 of the towing vehicle 100. The pin box 30 comprises a neck portion 32, a bottom plate 34, and a king pin 36. The neck portion 32 is commonly referred to as a "gooseneck" and attaches directly to a frame 92 or other structurally sound surface of the trailer 90. The bottom plate 34 is fixedly attached to a terminal end 38 of the pin box 30 and provides a solid attaching surface for the king pin 36. The king pin 36 comprises a solid or partially solid cylindrical post configured to compatibly engage a receiving feature 22 of the base 20. Typically, the king pin 36 is directly coupled to a receiving feature 22 of the base 20. However, the king pin 36 of the present invention is compatibly configured to be encased within a mounting ball 50 prior to engaging the receiving feature 22 of the base 20. As such, the mounting ball 50 provides a uniform, spherical surface to the king pin 36 thereby simplifying the alignment and coupling of the pin box 30 and the base 20.

The mounting ball 50 comprises an aluminum alloy or another suitable material. For example, in one embodiment the mounting ball comprises a non-corrosive, durable material. The mounting ball 50 is generally spherical and further comprises a cavity 52 for receiving the king pin 36. Additionally, the mounting ball 50 may include any feature necessary to enable the mounting ball 50 to securely retain the king pin 36. For example, in one embodiment the mounting ball 50 is secured to the king pin 36 via one or more fasteners such as bolts. In another embodiment, the mounting ball 50 is provided in two opposing halves. In this embodiment, the two halves are positioned around the king pin 36 and then affixed to one another via two or more fasteners. Alternatively, the mounting cavity 52 of the mounting ball 50 may include a set of threads or other feature for mechanically attaching to the outer surface of the king pin 36 without the need of a fastener. For example, in one embodiment the inner surface of the mounting 52 is modified to include a groove or channel 54 for accommodating a partially retained bearing 40 of the king pin 36. In this embodiment, the bearing 40 moves within the channel 54 easily, but requires significant force to be removed from the channel 54. As such, the king pin 36 is retained within the mounting ball 50 during the normal conditions of use.

Figure 4:
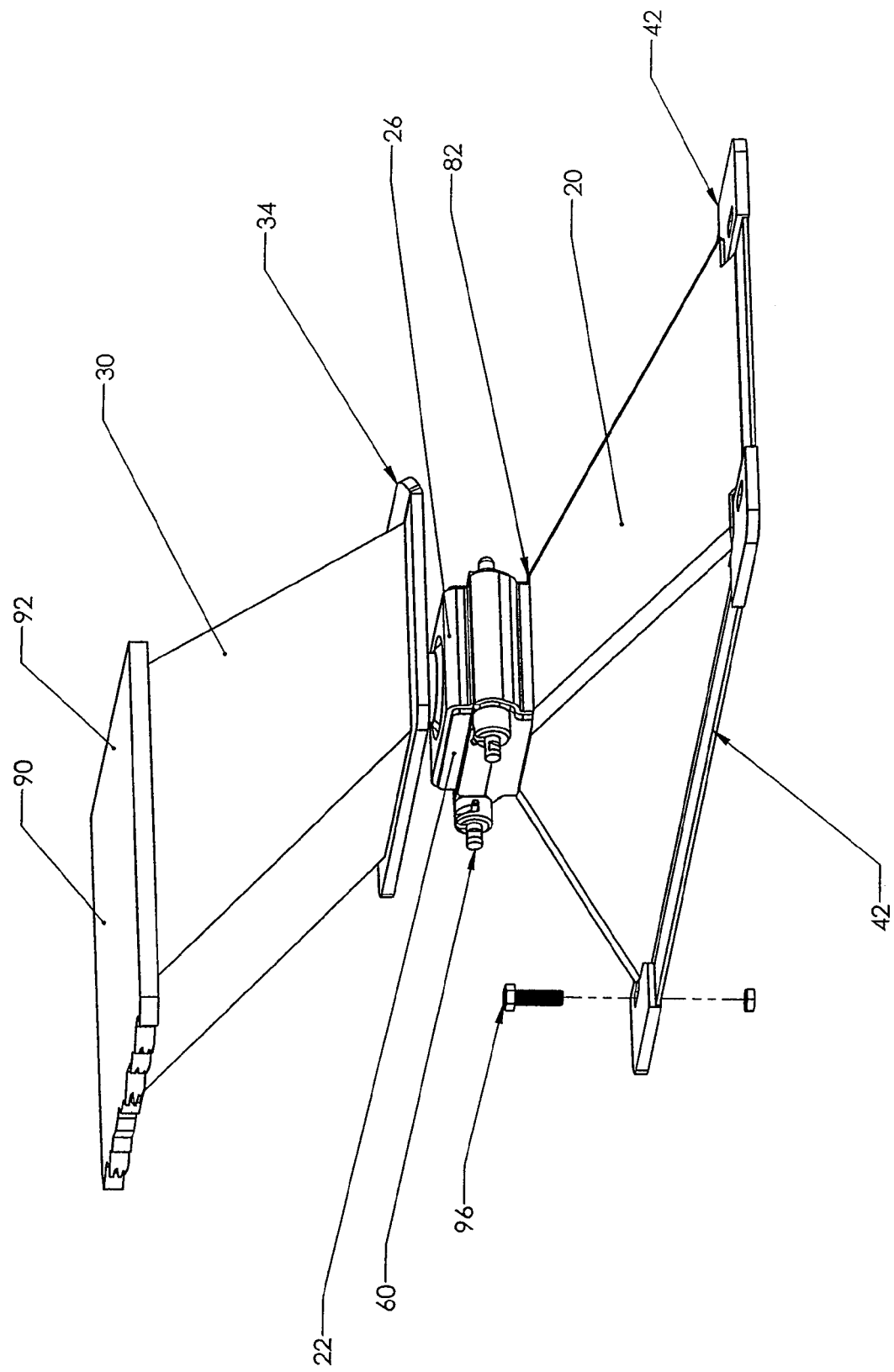
FIG. 4 is a perspective view of a representative embodiment of the present system in a coupled configuration.

The base 20 of the hitch system 10 is directly attached to a portion of the towing vehicle 100 via an appropriate fastener 96. The base 20 comprises a flange 42 through which the appropriate fastener 96 is inserted. In one embodiment, the base 20 is directly attached to the frame 102 of a truck via a nut and bolt fastener 96 system. The base 20 is generally box-shaped and configured to stably mount to the towing vehicle 100 and support the weight of the trailer 90 or other vehicle being towed. In one embodiment, the base 20 is generally pyramid shaped having a wider footing 80 and a narrower apex 82. In another embodiment, the base 20 comprises a truncated pyramid or frustum shape wherein the apex 82 is cut in a plane parallel to the plane of the footing 80, as best illustrated in FIGS. 4 and 5.

Figure 2:
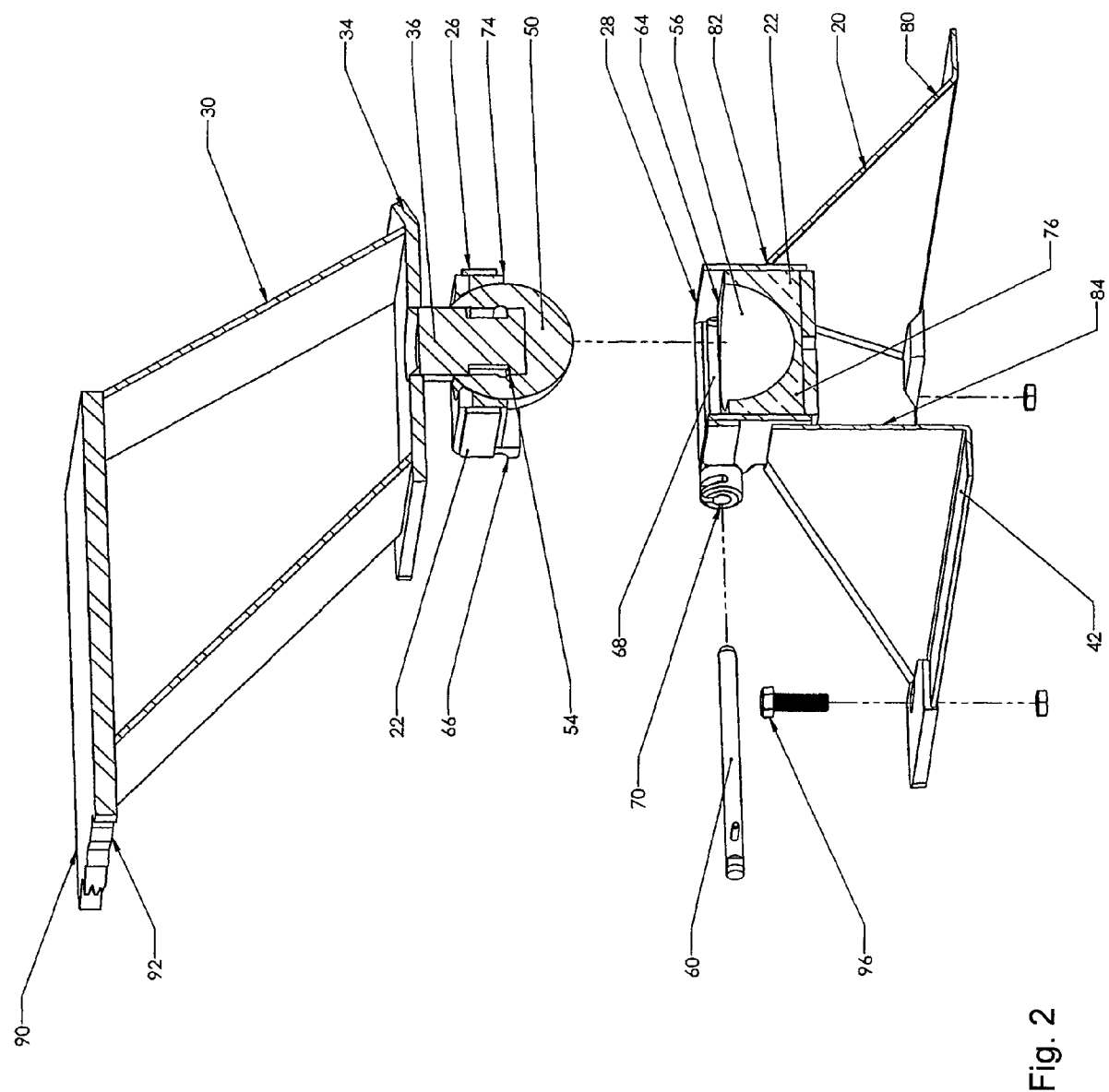
FIG. 2 is a cross-sectioned three-quarters view of a representative embodiment of the present system in an uncoupled configuration.

The apex 82 of the base 20 houses a receiving feature 22 of the hitch system 10. The receiving feature 22 of the base 20 is fixedly attached to the apex 82 of the base 20 and comprises the upper portion 24 of the base 20. The receiving feature 22 is the portion of the base 20 that directly receives the king pin 36 of the pin box 30. As such, the receiving feature 22 is comprised of materials suitable to withstand the stresses and opposing forces between the pin box 30 and the base 20. Referring now to FIG. 1 and FIG. 2, the receiving feature 22 comprises a top half 26 and a bottom half 28. The top half 26 and the bottom half 28 are configured to compatibly engage one another, and are secured to one another by at least one pin 60 or other locking mechanism. The top half 26 is configured to seat within a docking portion 64 of the bottom half 28. The top half 26 further comprises an interlocking flange 66 compatibly configured to engage an interlocking channel 68 of the bottom half 28. Once engaged, a pin 60 is inserted through a port 70 of the interlocking channel 68, thereby securing the interlocking flange 66 within the interlocking channel 68. Thus, the top half 26 and the bottom half 28 are secured to one another via the interactions of the interlocking flange 66, the interlocking channel 68 and the interposing pin 60.

The receiving feature 22 is further distinguished as comprising a concave, spherical surface 56 compatibly configured to receive the mounting ball 50 of the pin box 30. In one embodiment, the spherical surface 56 is divided into a first half 74 and a second half 76, each half located on, and corresponding to one of the top half 26 and bottom half 28 of the receiving feature 22. As such, the spherical surface 56 serves as a socket in compatibly receiving and retaining the mounting ball 50. As so retained, the mounting ball 50 is permitted to freely rotate within the receiving feature 22 in any direction. In one embodiment, a low-friction coating or material is applied to the spherical surface 56 to further provide unrestricted movement of the mounting ball 50 within the receiving feature 22. In another embodiment, a low-friction, self-lubricating coating or material is applied to the spherical surface 56 and the mounting ball 50 outer surface to further provide unrestricted movement of the mounting ball 50 within the receiving feature 22.

Figure 3:
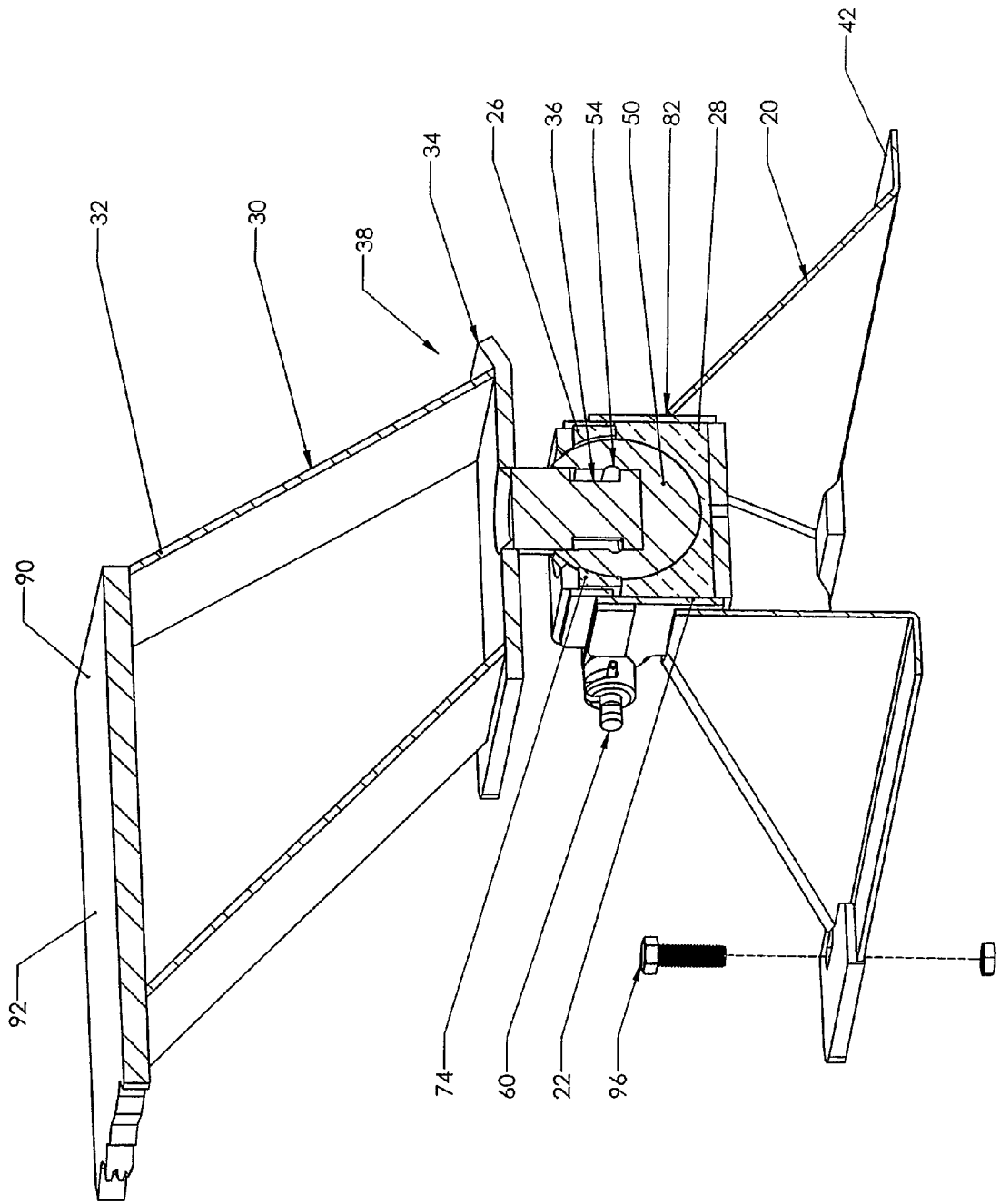
FIG. 3 is a coupled configuration of the system of FIG. 2.
Figure 5:
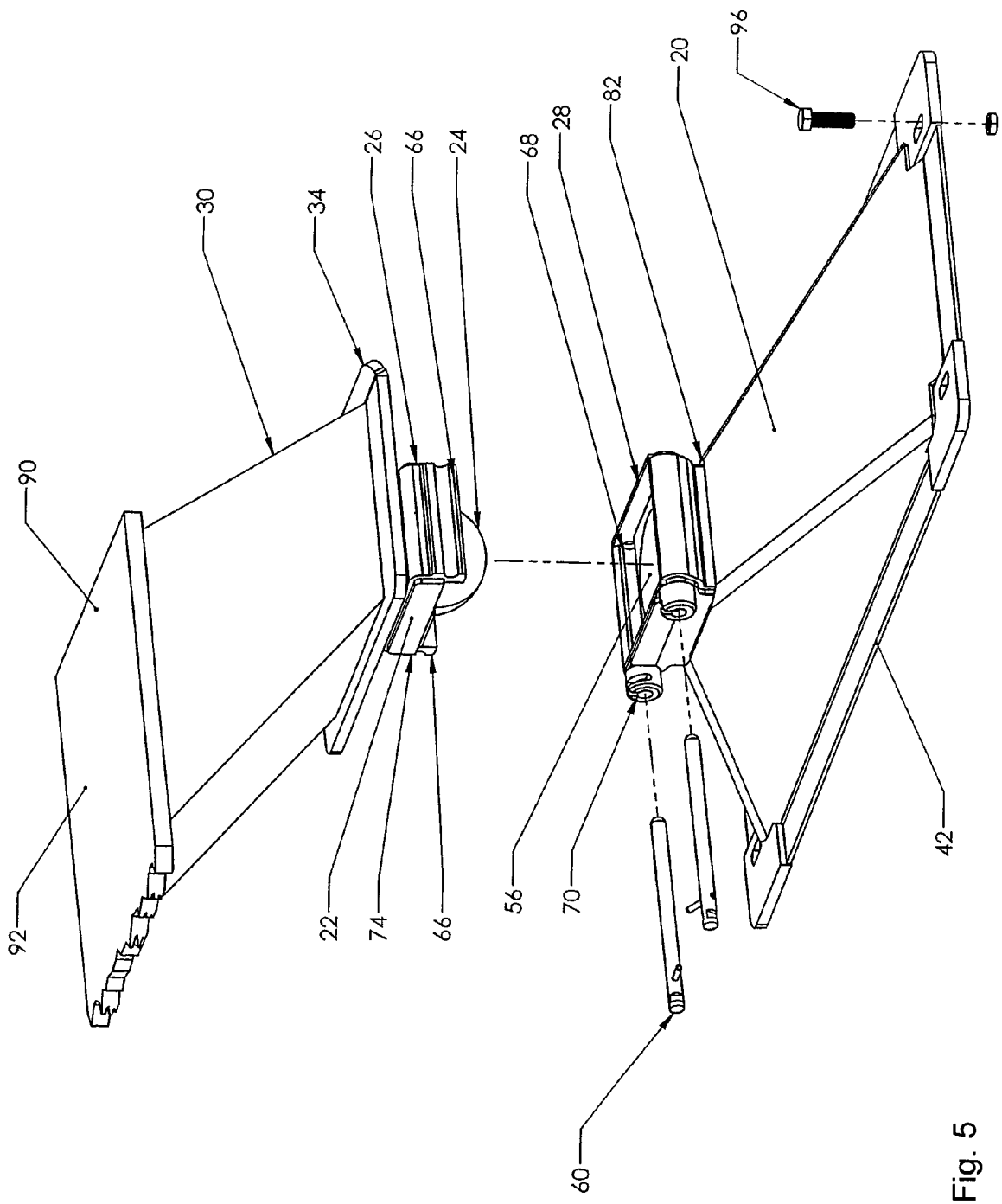
FIG. 5 is a perspective view of a representative embodiment of the present system in an uncoupled configuration.

Referring now to FIGS. 2-5, embodiments of the present system 10 are illustrated. Specifically, the components of the current invention are shown as engaged and disengaged from one another. Referring to FIG. 5, the hitch system 10 is shown in a disengaged configuration. Of particular note is the location of the top half 26 of the receiving feature 22 with respect to the remainder of the receiving feature 22. The top half 26 is located adjacent to the mounting ball 50, or more specifically is interposed between the top of the mounting ball 50 and the bottom plate 34 of the pin box 30. As shown in FIGS. 2 and 3, the top half 26 of the receiving feature 22 is rotatably positioned as a collar around the exposed shaft of the king pin 36. As such, the first half 74 of the spherical surface 56 is supported by an upper portion of the mounting ball 50 thereby preventing the removal of the top half 26 without removal of the mounting ball 50 from the king pin 36. Thus, the top half 26 of the receiving feature 22 is generally associated with the pin box 30 of the hitch system 10 as assembled.

The mounting ball 50 and the spherical surface 56 are selected to be of compatible shape and dimension. As such, the specific dimensions of the components 50 and 56 may vary as needed by system 10. In one embodiment, the mounting ball 50 and the spherical surface 56 each comprise a diameter of approximately 127 mm. The spherical contours of the mounting ball 50 and the concave surface 56 permit successful coupling of the trailer 90 to the towing vehicle 100 regardless of their angular relationship. For example, in one embodiment successful coupling is achieved where the angular relationship of the trailer 90 to the towing vehicle 100 is greater than 180°. In another embodiment, successful coupling is achieved where the angular relationship of the trailer 90 to the towing vehicle 100 is less than 180°. In another embodiment, successful coupling is achieved where the trailer 90 is in a first rotational axis and the towing vehicle is in a second rotational axis. In another embodiment, successful coupling is achieved where the trailer is in a first rotational axis, the towing vehicle is in a second rotational axis, and the angular relationship of the trailer 90 to the towing vehicle is less than or greater than 180°.

The trailer 90 and the towing vehicle 100 are coupled as the mounting ball 50 is secured within the receiving feature 22. This is accomplished by first generally aligning the mounting ball 50 of the pin box 30 in the same vertical plane as the receiving feature 22 of the base 20. Once generally aligned, the mounting ball 50 is lowered into the bottom or second half 76 of the spherical surface 56 of the receiving feature 22. Once engaged, one or more pins 60 are inserted into the port 70 of the interlocking channel 68 thereby securing the top half 26 of the receiving feature 22 to the bottom half 28. Once secured, the mounting ball 50 is retained within the receiving feature 22 thereby coupling the trailer 90 to the towing vehicle 100.

Figure 6:
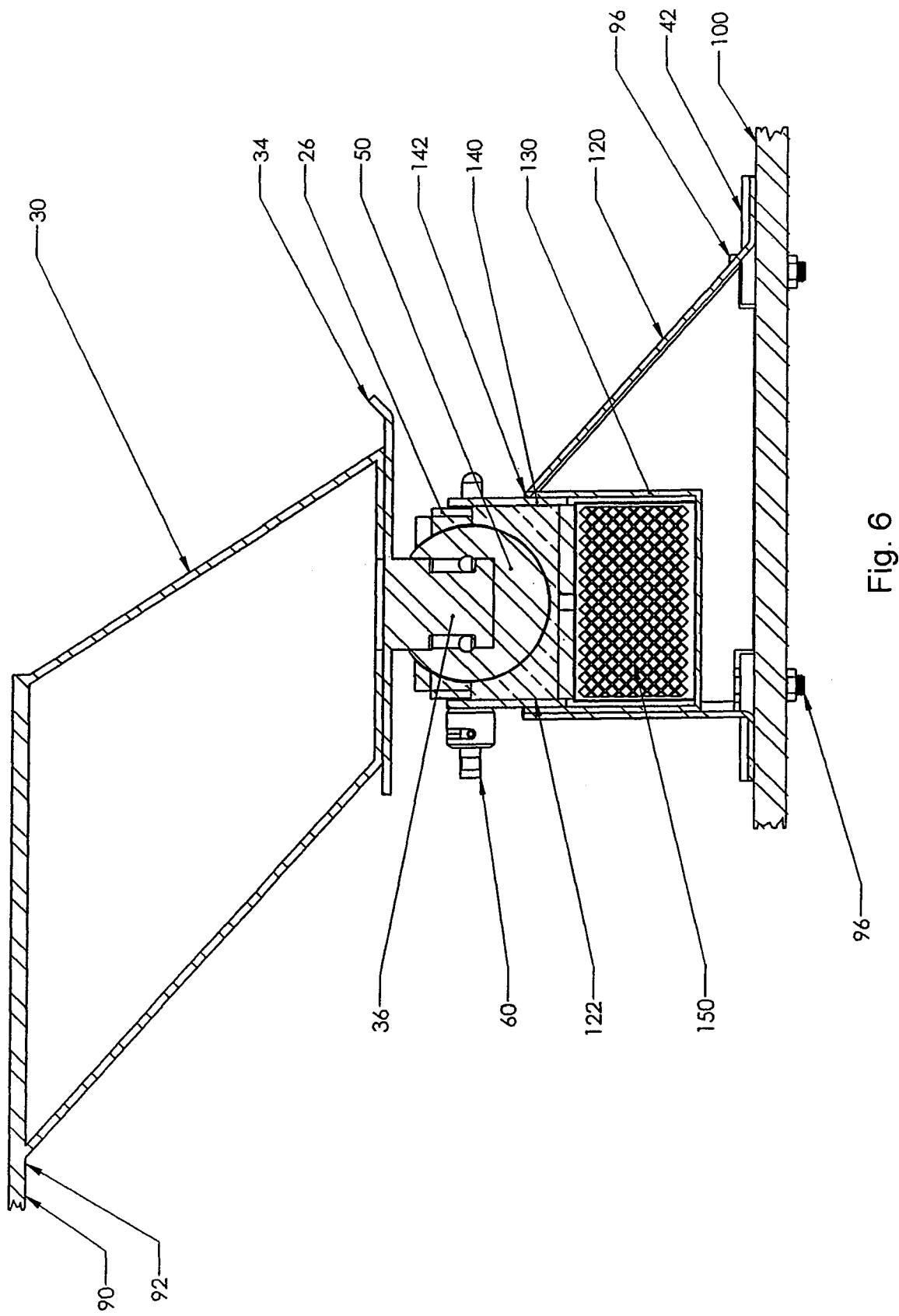
FIG. 6 is a cross-sectioned view of a representative embodiment of the present system in a coupled configuration including a suspension system.

One of skill in the art will appreciate that the hitch system 10 of the current invention may be modified to include other features commonly known in the art of towing and hauling. Referring to FIG. 6, for example, in one embodiment the base 120 is modified to include a suspension system 150. The base 120 is further modified to include a suspension compartment 130 for housing the suspension system 150 and the receiving feature 122. The receiving feature 122 is slidably retained within the suspension compartment 130 via a system of retaining clips 140 and retaining brackets 142. Additionally, the receiving feature 122 is attached to the suspension compartment 130 via the suspension system 150. As such, the receiving feature 122 is retained within the suspension compartment 130 and oscillates within the suspension compartment 130 via the suspension system 150.

The suspension system 150 may include any form of suspension compatible with the demands and conditions inherent in towing and hauling activities. In one embodiment, the suspension system 150 comprises gas and oil shocks. In another embodiment, the suspension system 150 comprises spring or elastomeric shocks. In yet another embodiment, the suspension system 150 comprises an air bag. In a final embodiment, the suspension system 150 comprises a combination of multiple forms of suspension. For each embodiment, the base 120 and receiving feature 122 are modified and adapted as required to incorporate successfully the selected form or forms of suspension.

Thus, as discussed herein, the embodiments of the present invention embrace technologies and methods for attaching vehicles via a hitched configuration, regardless of the angular relationship between the vehicles. As will be appreciated by one of skill in the art, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A vehicular hitching device, comprising:
    a mounting ball fixedly attached to a portion of a vehicle and having a convex, spherical contact surface, the mounting ball further encasing a king pin of the vehicle;
    a receiving feature attached to a portion of a towing vehicle, the receiving feature comprising a concave, spherical surface mirroring the spherical contact surface of the mounting ball, wherein the mounting ball is rotatably retained by the receiving feature; and
    means for securing the mounting ball within the receiving feature.

2. The hitching device of claim 1, wherein the mounting ball further comprises a first half and a second half, the king pin being encased between the first half and the second half by interposing the king pin between the first half and second half and then fastening the first half to the second half with at least two fasteners.

3. The hitching device of claim 1, wherein the receiving feature further comprises:
    a base member having a footing and an apex, the footing being selectively attached to the towing vehicle, and the apex extending vertically upward from the footing; and
    a ball socket attached to the apex of the base member, the ball socket comprising the spherical surface of the receiving feature.

4. The hitching device of claim 3, wherein the ball socket further comprises a first half and a second half, the first half being fixedly attached to the apex of the base member and comprising a first half of the spherical surface, the second half being rotatably interposed between the mounting ball and the vehicle, and comprising a second half of the spherical surface, wherein upon seating the mounting ball within the first half of the spherical surface, the second half of the ball socket compatibly engages the first half of the ball socket thereby enclosing the mounting ball within the receiving feature.

5. The hitching device of claim 3, wherein the base member further comprises suspension between the ball socket and the apex.

6. The hitching device of claim 4, wherein the ball socket further comprises means for securing the first half of the ball socket within a portion of the second half of the ball socket, wherein the means for securing further retains the mounting ball within the receiving feature.

7. The hitching device of claim 1, wherein the mounting ball comprises a low-friction, polymer material.

8. A method for coupling a first vehicle to a second vehicle, comprising:
    fixing a mounting ball to a portion of the first vehicle, the mounting ball having a convex, spherical contact surface, the mounting ball further having a low-friction, polymer material;
    fixing a receiving feature to a portion of the second vehicle, the receiving feature having a concave, spherical surface mirroring the spherical contact surface of the mounting ball;
    generally aligning the mounting ball and the receiving feature;
    seating the mounting ball within the receiving feature; and
    securing the mounting ball within the receiving feature via a locking mechanism.

9. The method of claim 8, wherein the mounting ball encases a king pin of the vehicle.

10. The method of claim 9, wherein the mounting ball further comprises a first half and a second half, the king pin being encased between the first half and the second half by interposing the king pin between the first half and second half and then fastening the first half to the second half with at least two fasteners.

11. The method of claim 8, wherein the receiving feature further comprises:

a base member having a footing and an apex, the footing being selectively attached to the towing vehicle, and the apex extending vertically upward from the footing; and a ball socket attached to the apex of the base member, the ball socket comprising the spherical surface of the receiving feature.

12. The method claim 11, wherein the ball socket further comprises a first half and a second half, the first half being fixedly attached to the apex of the base member and comprising a first half of the spherical surface, the second half being rotatably interposed between the mounting ball and the vehicle, and comprising a second half of the spherical surface, wherein upon seating the mounting ball within the first half of the spherical surface, the second half of the ball socket compatibly engages the first half of the ball socket thereby enclosing the mounting ball within the receiving feature.

13. The method of claim 12, wherein the ball socket further comprises means for securing the first half of the ball socket within a portion of the second half of the ball socket, wherein the means for securing further retains the mounting ball within the receiving feature.

14. A fifth wheel hitch system, comprising:
a king pin fixedly attached to a portion of a first vehicle;
a mounting ball encasing a portion of the king pin, the mounting ball having a convex, spherical contact surface;
a receiving feature attached to a portion of a second vehicle, the receiving feature having a concave, spherical surface mirroring the spherical contact surface of the mounting ball; and
means for securing the mounting ball within the receiving feature, wherein the mounting ball is rotatably retained by the receiving feature.

15. The hitch system of claim 14, wherein the mounting ball encases a king pin of the vehicle.

16. The hitch system of claim 15, wherein the mounting ball further comprises a first half and a second half, the king pin being encased between the first half and the second half by interposing the king pin between the first half and second half and then fastening the first half to the second half with at least two fasteners.

17. The hitch system of claim 14, wherein the receiving feature further comprises:

a base member having a footing and an apex, the footing being selectively attached to the towing vehicle, and the apex extending vertically upward from the footing; and a ball socket attached to the apex of the base member, the ball socket comprising the spherical surface of the receiving feature.

18. The hitch system of claim 17, wherein the ball socket further comprises a first half and a second half, the first half being fixedly attached to the apex of the base member and comprising a first half of the spherical surface, the second half being rotatably interposed between the mounting ball and the vehicle, and comprising a second half of the spherical surface, wherein upon seating the mounting ball within the first half of the spherical surface, the second half of the ball socket compatibly engages the first half of the ball socket thereby enclosing the mounting ball within the receiving feature.

19. The hitch system of claim 18, wherein the ball socket further comprises means for securing the first half of the ball socket within a portion of the second half of the ball socket, wherein the means for securing further retains the mounting ball within the receiving feature.

20. The hitch system of claim 14, wherein at least one of the mounting ball and the ball socket further comprises an external coating of a self-lubricating polymer material.

21. A suspension hitching device, comprising:
a mounting ball fixedly attached to a portion of a vehicle and having a convex, spherical contact surface;
a receiving feature comprising:
a concave, spherical surface mirroring the spherical contact surface of the mounting ball;
a base member having a footing and an apex, the footing being selectively attached to the vehicle, and the apex slidably housing the concave, spherical surface; and
suspension interposed between the concave, spherical surface and the apex of the base member; and
means for securing the mounting ball within the receiving feature, wherein the base member is stationarily mounted to the vehicle, and wherein the concave, spherical surface and the retained mounting ball move relative to the stationary base member via the suspension.

* * * * *